(12) United States Patent
Kruckemyer et al.

(10) Patent No.: US 9,652,391 B2
(45) Date of Patent: May 16, 2017

(54) COMPRESSION OF HARDWARE CACHE COHERENT ADDRESSES

(71) Applicant: Arteris, Inc., Campbell, CA (US)

(72) Inventors: David A. Kruckemyer, San Jose, CA (US); Craig Stephen Forrest, San Francisco, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 14/985,354

(22) Filed: Dec. 30, 2015

(65) Prior Publication Data

US 2016/0188473 A1 Jun. 30, 2016

Related U.S. Application Data

(60) Provisional application No. 62/097,805, filed on Dec. 30, 2014.

(51) Int. Cl.
| | |
|---|---|
| *G06F 12/08* | (2016.01) |
| *G06F 12/06* | (2006.01) |
| *G06F 12/0815* | (2016.01) |
| *G06F 12/0893* | (2016.01) |

(52) U.S. Cl.
CPC ...... *G06F 12/0815* (2013.01); *G06F 12/0893* (2013.01); *G06F 12/06* (2013.01); *G06F 2212/621* (2013.01)

(58) Field of Classification Search
None
See application file for complete search history.

(56) References Cited

U.S. PATENT DOCUMENTS

2009/0019219 A1* 1/2009 Magklis ............ G06F 12/0833
711/105

OTHER PUBLICATIONS

Liu, Jiangjiang, et al. "Memory system compression and its benefits."ASIC/SOC Conference, 2002. 15th Annual IEEE International. IEEE, 2002.*
Mahapatra, Nihar R., Jiangjiang Liu, and Krishnan Sundaresan. "The performance advantage of applying compression to the memory system."ACM SIGPLAN Notices. vol. 38. No. 2 supplement. ACM, 2002.*
Kant, Krishna, and Ravi Iyer. "Design and performance of compressed interconnects for high performance servers." Computer Design, 2003. Proceedings. 21st International Conference on. IEEE, 2003.*

(Continued)

*Primary Examiner* — Charles Rones
*Assistant Examiner* — Hewy Li (57) ABSTRACT

Compression of address bits within a cache coherent subsystem of a chip is performed, enabling a cache coherent subsystem to avoid transmitting, storing, and operating upon unnecessary address information. Compression is performed according to any appropriate lossless algorithm, such as discarding of bits or code book lookup. The algorithm may be chosen according to constraints on logic delay and silicon area. An algorithm for minimum area would use a number of bits equal to the rounded up binary logarithm of the sum of all addresses of all memory regions. A configuration tool generates a logic description of the compression algorithm. The algorithm may be chosen automatically by the configuration tool. Decompression may be performed on addresses exiting the coherent subsystem.

16 Claims, 11 Drawing Sheets

(56) References Cited

OTHER PUBLICATIONS

Park, Arvin, and Matthew Farrens. "Address compression through base register caching." Microprogramming and Microarchitecture. Micro 23. Proceedings of the 23rd Annual Workshop and Symposium., Workshop on. IEEE, 1990.*

Liu, Jiangjiang, Krishnan Sundaresan, and Nihar R. Mahapatra. "Dynamic address compression schemes: a performance, energy, and cost study."Computer Design: VLSI in Computers and Processors, 2004. ICCD 2004. Proceedings. IEEE International Conference on. IEEE, 2004.*

* cited by examiner

Uncompressed address bit					Compressed address bit

FIG. 11

COMPRESSION OF HARDWARE CACHE COHERENT ADDRESSES

CROSS-REFERENCE TO RELATED APPLICATIONS

The present invention claims the benefit of U.S. Provisional Application Ser. No. 62/097,805 titled COMPRESSION OF HARDWARE CACHE COHERENT ADDRESSES filed on Dec. 30, 2014 by David A. KRUCKEMYER et al., the entire disclosure of which is incorporated in its entirety by reference.

FIELD OF THE INVENTION

The present invention is in the field of computer systems, in particular systems-on-chip comprising heterogeneous processing units, including processor cores, graphics processing units, and other components that transmit, store, and operate on memory addresses.

BACKGROUND

Modern computer systems are designed with heterogeneous processing units that perform data processing operations on data values stored in memory. To access a particular data value, a processing unit implements a request address bus that designates the memory location to be accessed. Many processing units and other interconnect masters implement more request address bits than are necessary to access all the legally addressable memory locations in a system. One example of such a system comprises a processing unit with a 40 bit address bus that can address $2^{40}$ bytes; a $2^{32}$-byte (4 GB) addressable memory region of DRAM; and one or more small addressable memory regions, such that the sum of all addressable memory regions is significantly less than $2^{40}$ bytes (1 TB).

Processing units may communicate with other processing units and memory through a transport mechanism. In such a system, addresses may be transmitted between units via buses in the transport mechanism and maybe stored in transaction tables and FIFOs in the various components. If the system contains cache coherent processing units, addresses may also be stored in cache tags. Components may perform address operations, such as decoding addresses to determine memory regions or comparing addresses to determine the result of a cache access or to detect overlapping accesses to the same memory location. Such systems store, transport, and operate on the full request address.

Storing full addresses, especially in structures such as cache tags, uses a significant amount of silicon area, which drives manufacturing cost, and transmitting full addresses requires additional wires that further increases silicon area. In addition, operating on full addresses requires significant logic gate delay that limits clock speed and system performance, and all of these artifacts increase the power consumption of the system. Therefore, what is needed is a system and method to compress addresses such as those associated with cache coherent memory locations.

SUMMARY OF THE INVENTION

In accordance with various aspects of the invention, a system and method are provided with a compressing scheme for addresses in cache coherent memory locations that stores, transports, and operates on fewer bits to represent the addresses of memory regions accessible within a cache coherent subsystem. By doing so, a system can use less silicon area, less power, operate at a higher clock speed, and do so at lower cost.

In accordance with various aspects of the invention, a method of performing transactions in a cache coherent subsystem is presented. The method includes receiving an original address. The original address is compressed. The compressed address is used within the coherent subsystem to direct requested accesses to one memory region or another. In accordance with the aspects of the invention, the compression can be done according to any possible algorithms, a simple one being the discarding of bits with unnecessary information and the scope of the invention is not limited thereby. In accordance with various aspects of the invention, an embodiment that presents a minimum number of address bits would have at most a number of bits equal to the ceiling of the binary logarithm of the total amount of legally addressable memory. Addresses exiting the coherence domain that need to be decoded outside of the coherence domain are decompressed for such use.

In accordance with various aspects of the invention, one embodiment includes a method of creating a logic description of logic that performs the invented method. The method includes accepting a specification of memory regions. Each region is identified as being either coherent memory region or not—non-coherent memory region. Based on that information, logic is appropriately configured and a logic description is outputted. The logic, the description of which is outputted, accepts an input address, encodes it according to a selected compression algorithm, and outputs a compressed address. The compression algorithm is chosen either by a designer or automatically according to design constraints on timing delay and silicon area.

In accordance with various aspects, the invention is also embodied in a configuration tool for such logic. The configuration tool is implemented as a computer running software, the software program being one that performs the above method.

DETAILED DESCRIPTION

The invention is described in accordance with the aspects and embodiments in the following description with reference to the FIGs., in which like numbers represent the same or similar elements. Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

The invention can be embodied in, though not exclusively, a system-on-chip (SoC) that instantiates a cache coherent subsystem. The coherent subsystem has structures for one or more of storing addresses in transaction tables, storing information in FIFOs, storing cache tags, transporting addresses to or from interfaces, and operating on addresses. Some examples of operations are comparing, decoding, and adding.

According to some aspects of the invention, the method of compression of address bits is chosen based on the address map. This is practical only in systems that are configured with foreknowledge of the address map. Network-on-Chip (NoC) IPs that are generalized for the address map of any chip, or chips that are generalized for any programmable remapping of memory regions are able to take advantage of the disclosed compression to the extent that the address map is constrained in a known way. The aspects and embodiments of the invention are useful in physically addressed (i.e. post-MMU) caches within fully coherent agents. Furthermore, the scope of the invention is not limited to a specific type of memory; all forms of persistent and non-persistent word-addressable memory technologies, including register arrays, flash, etc.

For systems of configurable IP, a designer specifies addressable memory regions, and whether each is coherent. A software configuration tool then uses the specification to generate a hardware description of structures that implement compression according to the various aspects and embodiments of the invention.

Figure 1:
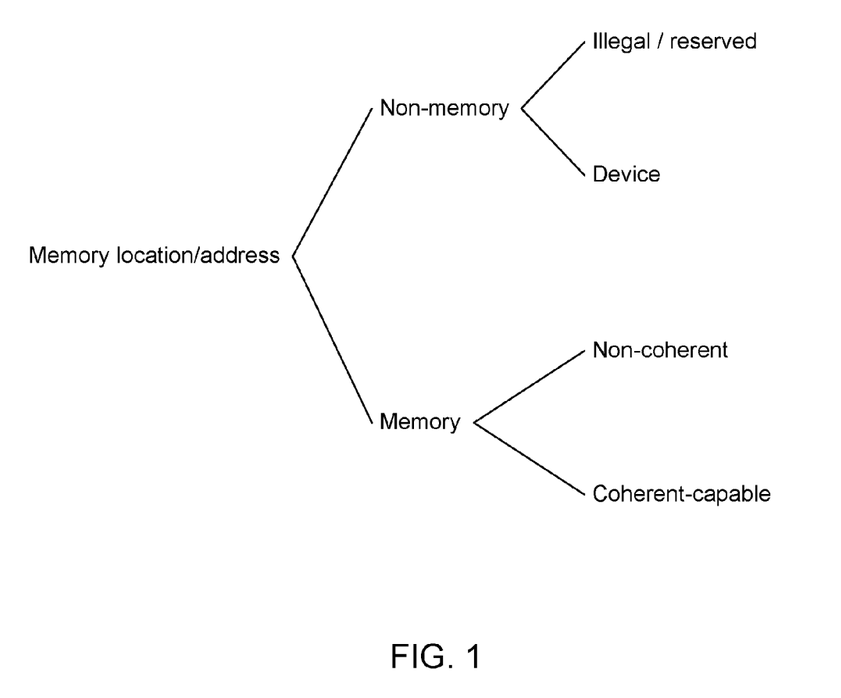
FIG. 1 illustrates a taxonomy of memory locations with various types of addressable elements according to aspects of the invention.

Processing units, and other masters, assert addresses as part of performing memory transactions. As shown in FIG. 1, each memory location and its corresponding address represents a certain type of memory. In accordance with the various aspects of the invention, each address is first classified as a non-memory address or as a memory address. Non-memory addresses represent either illegal (reserved) locations or non-memory locations. Memory addresses represent either coherent-capable memory locations, i.e. those that are capable of coherency, or memory locations that are not capable of being coherent due to strict specification or design constraints. All cacheable memory is also coherent-capable memory. Memory locations that are not capable of being coherent are called non-coherent memory locations. Memory locations are grouped into memory regions such that each memory region corresponds to a particular addressable slave.

The scope of the invention is applicable to any type of addressable slaves in subsystems that use less than the full address space. According to some embodiments of the invention some such slaves are DRAMs and others are SRAMs. Embodiments disclosed herein are directed to use in coherent subsystems and refer to DRAM and SRAM slaves as examples. The invention is not limited to any particular type of coherent subsystem or any particular types of slaves or any specific type of memory.

In accordance with the aspects and embodiment of the invention a transport interconnect is utilized. As disclosed herein, a transport interconnect is a component of a system that implements functions and interfaces to allow other components to issue and receive transactions from each other. A transport interconnect is implemented by creating one or more of the following types of units:

(a). Ingress access units, which receive transactions from an external connected system component, and transmit them into the transport interconnect. Ingress units also perform access functions which may include, but are not limited to, protocol translation, transaction access semantics translation, transient transaction storage and re-ordering, splitting external access transactions into multiple internal transport interconnect transactions and merging multiple external access transactions into single internal transport interconnect transactions.

(b). Egress access units, which receive transactions from the transport interconnect, and transmit them to an external connected system component. Egress units also perform access functions which may include, but are not limited to, protocol translation, transaction access semantics translation, transient transaction storage and re-ordering, splitting internal transport transactions into multiple external access transactions and merging multiple internal transport transactions into single external access transactions.

(c). Link units, which have a single input connection and a single output connection. Link unit's primary function is to transport a transaction from the input connector to the output connector without reformatting or in any other way changing the transaction from its path from the input connector to the output connector. Typically, a link is simply a set of wires, but in some cases, it may be a pipelined datapath where transactions may take a number of clock cycles to travel from the input connect to the output connector.

(d). Switching units, which have one or more independent input connections and one or independent output connections. Each transaction that is received on an input connection is forwarded to an output connection. The specific output connection is selected by examining the incoming transaction. In some cases the output port is explicitly named within the incoming transaction. In other cases, the output port is selected via algorithms implemented in the switch. Switching units may implement arbitration algorithms in order to ensure that transactions from input connections are forwarded output connections so as to satisfy the system requirements for transaction prioritization and starvation avoidance. Additionally, switch units may implement other functionality that may include, but is not limited to, security functions, logging transactions, tracing transactions, voltage domain management, clock domain management, bandwidth adaptation, traffic shaping, transient transaction storage, clock domain crossing and voltage domain crossing.

An interconnect transport is built by creating and connecting multiple units, of each type. Ingress units are connected to input connectors of link units or switch units. Egress units are connected to output connectors of link units or switch units. In addition, the input connection of a link unit connects to an output connection of a switch (or an Ingress unit), and the output connection of a link unit connects to an input connection of a switch (or an Egress unit).

A transport network, according to some embodiments of the invention, is packet-based. In some embodiments, it may support read requests, or write requests or both read and write requests, and issues a response to each request. In other embodiments, it may support read requests, or write requests or both read and write requests, and will not issue a response, or any other form of positive acknowledgment to every request. In other embodiments, the transport network is message-based. In some embodiments multi-party transactions are used such that initiating agent requests go to a coherence controller, which in turn forwards requests to other caching agents, and in some cases a memory, and the agents or memory send responses directly to the initiating requestor.

In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic. In some embodiments the transport interconnect is a network-on-chip (NoC). In other embodiments, the transport interconnect has a switch topology of a grid-based mesh or depleted-mesh. In other embodiments a network interconnect has a topology of switches of varied sizes. In some embodiments the transport interconnect implements a switch topology of a crossbar. In some embodiments, a network-on-chip uses virtual channels.

Figure 2:
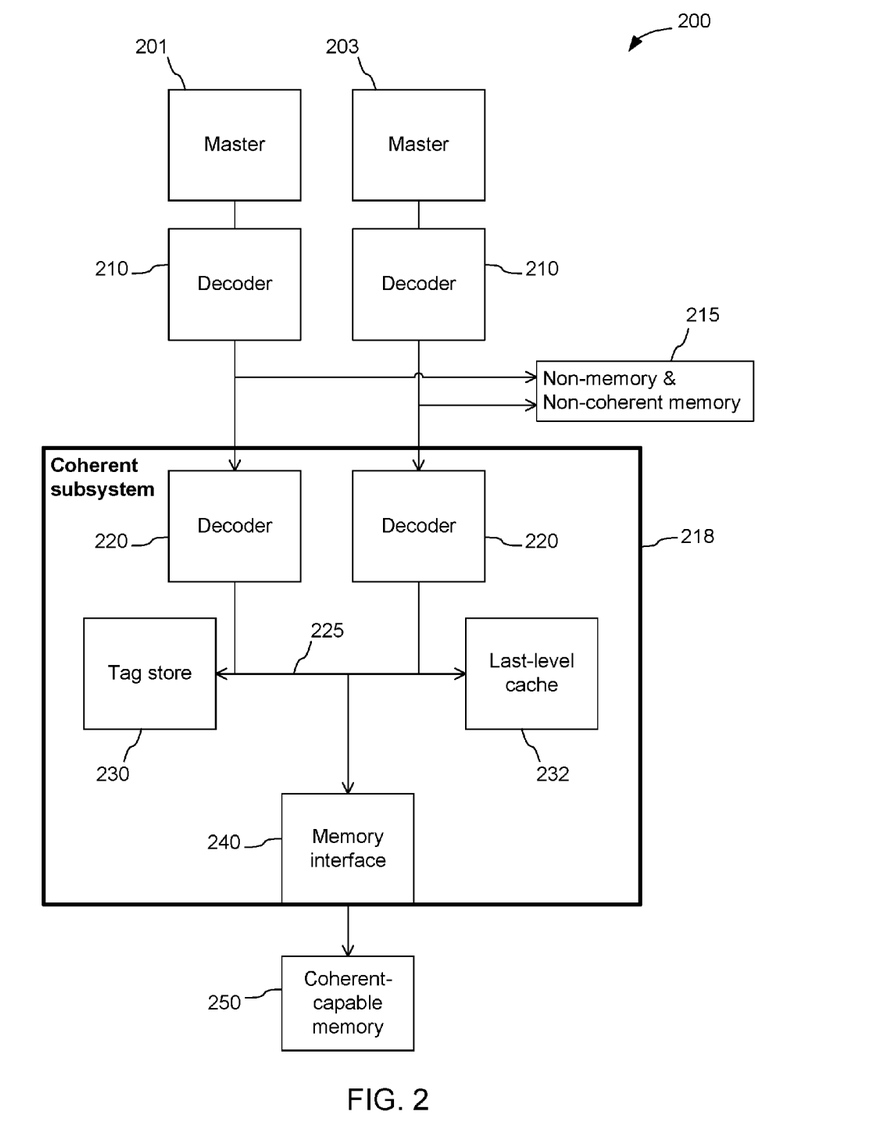
FIG. 2 illustrates a system including masters and memory regions including a coherent subsystem according to an embodiment of the invention.

Referring now to FIG. 2, in accordance with the various aspects of the invention, a system 200 with a representative cache coherent subsystem is shown. The system 200 includes master 201 and master 203. Master 201 and master 203 assert addresses that are equivalently decoded in decoders 210. In accordance with the various aspects of the invention and some embodiments, some masters need not access non-memory or non-coherent memory addresses. In such embodiments, decoders 210 are not present. In the embodiment of FIG. 2, transactions to non-memory locations and non-coherent memory locations are sent to slaves 215. A transaction, as used herein, includes a request and a response as well as an address. Transactions to coherent memory locations are sent to coherent subsystem 218. Decoders 220 perform a further decoding operation on the addresses of the transaction and direct the transactions over transport network 225 to, as appropriate for the transaction, a tag store 230, a last-level cache 232, or a memory interface 240. The memory interface 240 sends transaction requests to coherent-capable memory slave 250.

Addresses asserted by masters that perform cache coherent transactions can be any number of bits, but in current systems addresses are typically from 32 to 64 bits. In one embodiment, a system has masters that assert 40 bit addresses. A 40 bit address is capable of addressing $2^{40}$ bytes, or 1 terabyte (TB), of data. Few current systems implement a single memory region with more than 4 gigabytes (GB) of data, and often the total legally addressable memory does not exceed 8 GB. That means that, theoretically, only $\log_2(8\ GB)=33$ address bits are needed to encode and access the slaves, and 7 of the 40 address bits are unnecessary. However, for various reasons generally relating to ease of computer programming, the ranges of the address space at which slaves are mapped are sparsely noncontiguous.

Figure 3:
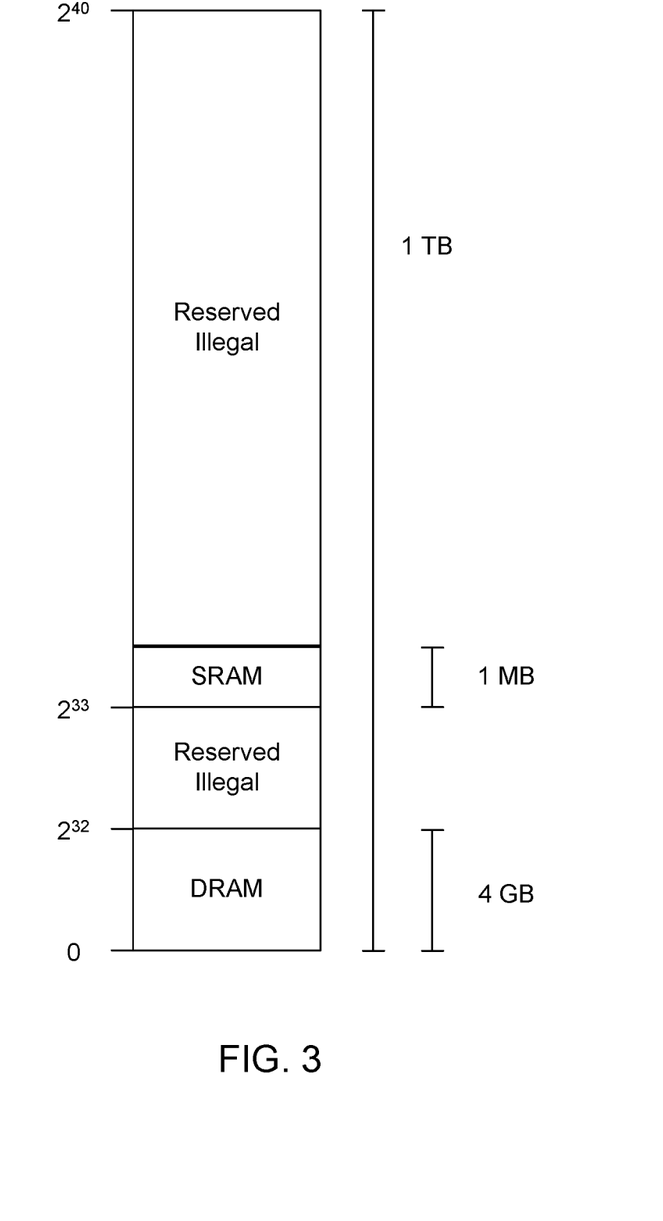
FIG. 3 illustrates the address map of an embodiment of the invention.

Referring now to FIG. 3, an address space of a first embodiment of the invention in which a DRAM slave with 4 GB of data storage is accessible at an address range from 0 to $2^{32}-1$. A SRAM slave with 1 MB of address space is accessible from address $2^{33}$ up to $2^{33}+1$ MB$-1$ (hexadecimal 0x2_0000_0000 to 0x2_000F_FFFF). In this embodiment, bits 0-19 address particular data values within the SRAM, bits 0-31 address particular values within the DRAM, and bit 33 distinguishes between accessing the DRAM and the SRAM.

Figure 4:
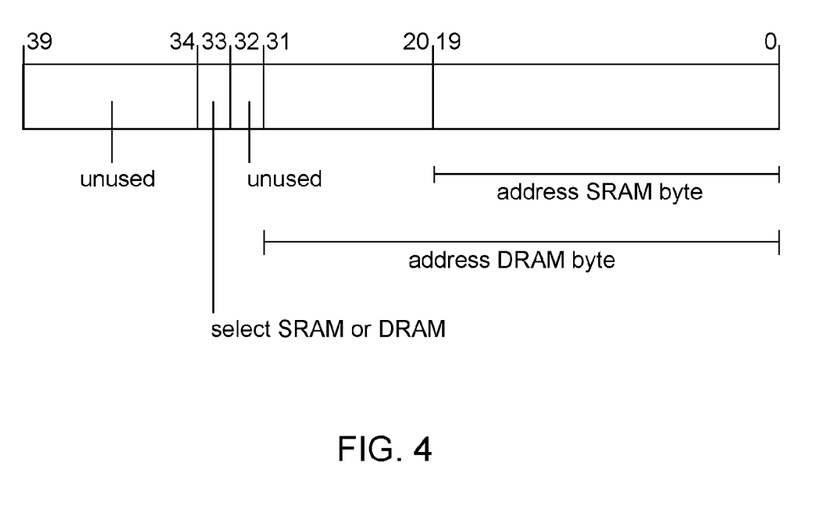
FIG. 4 illustrates the address bit meaning of an embodiment of the invention.

Referring now to FIG. 4, bit 32 and bits 34-39 are unused as shown. In accordance with the aspects of the invention, the values of the unused bits are implied, since they are common across all legally addressable memory regions, so the bits are unnecessary when accessing the memory regions.

Figure 5:
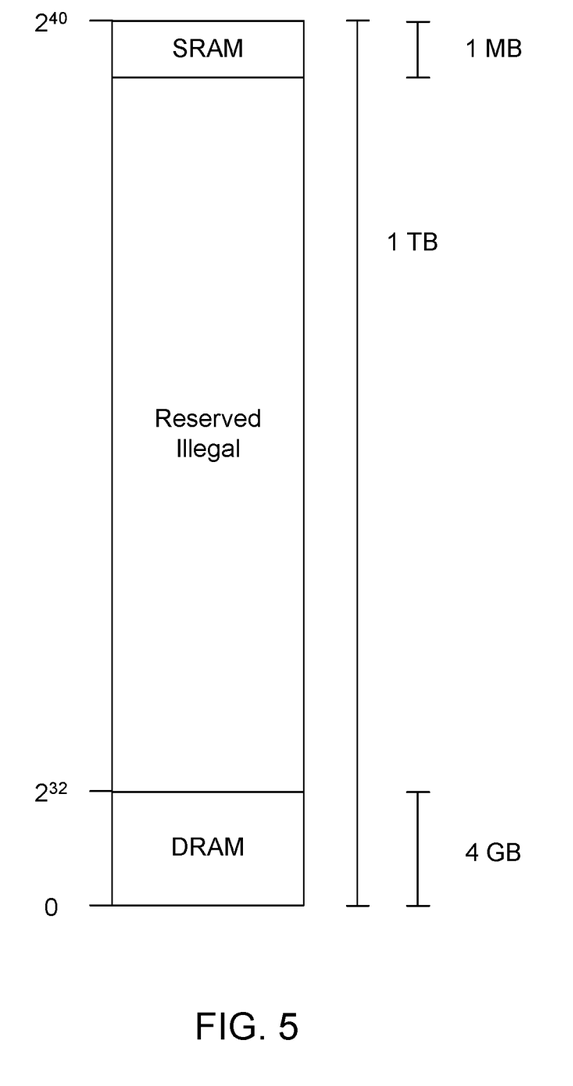
FIG. 5 illustrates the address map of an embodiment in of the invention.

Referring now to FIG. 5, an address space of a second embodiment is shown. The same DRAM is mapped to the lowest 4 GB of the address space and the SRAM is mapped to the highest 1 MB of the address space.

Figure 6:
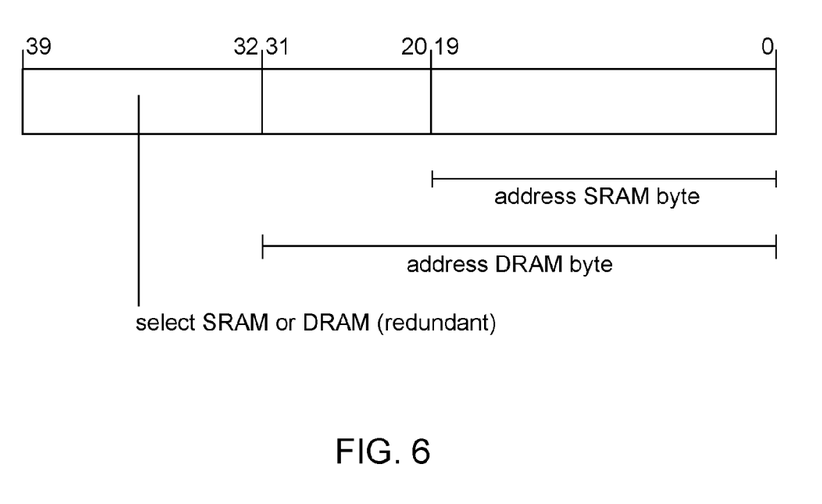
FIG. 6 illustrates the address bit meaning of an embodiment of the invention.

Referring now to FIG. 6, bits 0-19 address particular data values within the SRAM, bits 0-31 address particular values within the DRAM, and bits 32-39 distinguishes between accessing the DRAM and the SRAM. All of bits 32-39 are 0s for DRAM and 1s for SRAM. Because bit 32 is sufficient to distinguish between slaves, bits 33-39 carry redundant, and therefore unnecessary, information.

Figure 7:
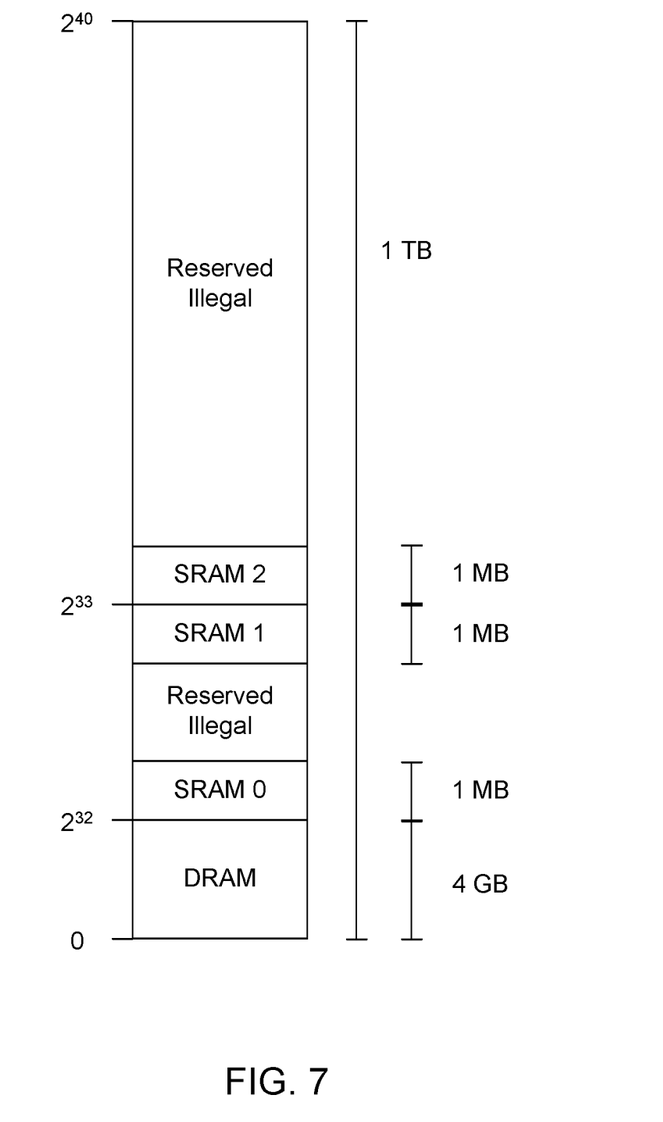
FIG. 7 illustrates the address map of an embodiment of the invention.

Referring now to FIG. 7, an address space of a third embodiment is shown. The same DRAM is mapped to the lowest 4 GB of the address space, SRAM 0 is mapped to the first 1 MB above the DRAM. SRAM 1 is mapped to the 1 MB range at the top of the $2^{nd}$ 4 GB range. SRAM 2 is mapped to the 1 MB range at the bottom, of the third 4 GB range in the address space.

Figure 8:
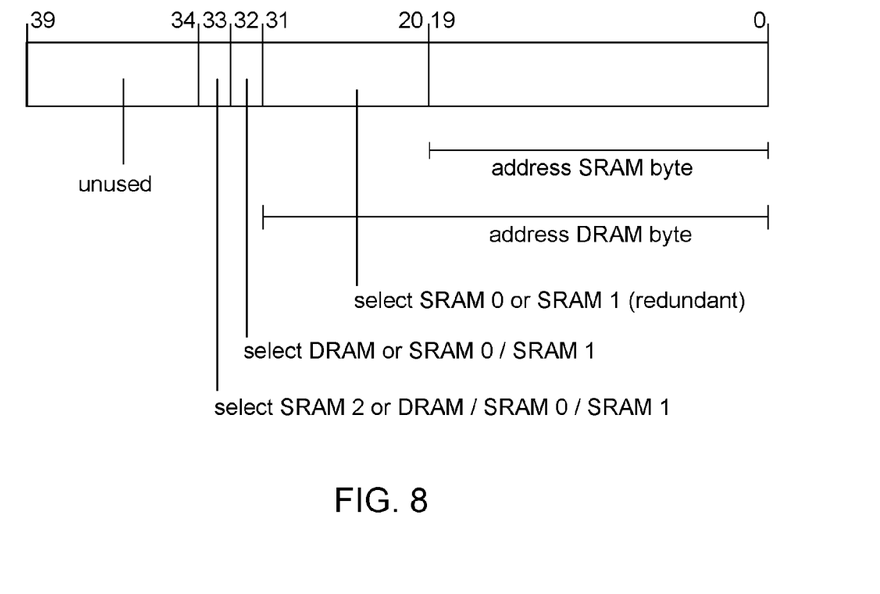
FIG. 8 illustrates the address bit meaning of an embodiment of the invention.

As shown in FIG. 8, bits 0-19 address particular data values within any of the SRAMs, bits 0-31 address particular values within the DRAM. Bits 31-20 redundantly select between SRAM 0 and SRAM 1. Bit 32 distinguishes between accessing the DRAM and (SRAM 0 or SRAM 1).

Bit 33 distinguishes between accessing SRAM 2 and (DRAM, SRAM 0, or SRAM 1). Bits 34-39 are unused. Again, the unused bits and redundant bits provide unnecessary information.

According to an aspect of the invention, the address information that is stored, transported, and operated on within the cache coherent subsystem is compressed. Any of many known forms of lossless compression can be used. Some examples are truncation, codebook look-up, and Huffman coding.

Figure 9:
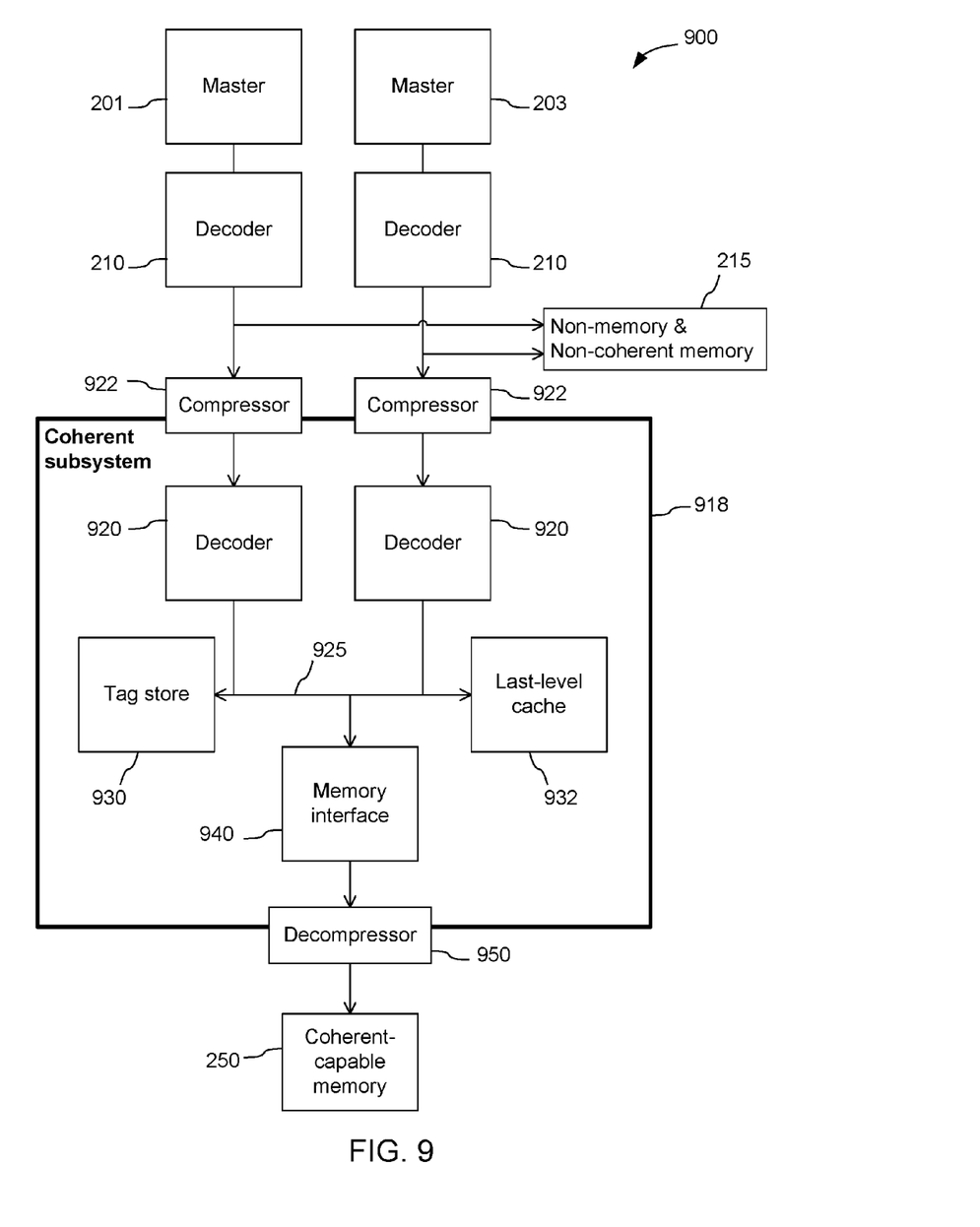
FIG. 9 illustrates a system including masters and memory regions comprising a coherent subsystem according to an embodiment of the invention.

Referring now to FIG. 9, a system 900 is shown according to an embodiment. The system 900 includes master 201 and master 203. The master 201 and master 203 assert addresses that are equivalently decoded in decoders 210. Transactions to non-memory locations and non-coherent memory locations are sent to slaves 215. Transactions to coherent memory locations are sent to a coherent subsystem 918 through compressors 922. Decoders 920 perform a decoding operation on the addresses and send the transactions over a transport network 925 to, as appropriate for the transaction, a tag store 930, a last-level cache 932, or a memory interface 940. The memory interface 940 sends transaction requests through decompressor 950 to coherent-capable memory slave 250.

In the embodiment of FIG. 3, compression is performed by discarding unused address bits. For an address space as in FIG. 3, accessed by uncompressed addresses represented as in FIG. 4, addresses are encoded within the coherent subsystem as a 33 bit address comprising, of the original 40 bit address, the concatenation of bit 33 and bits 31-0.

In the embodiment of FIG. 5, compression is performed by discarding redundant address bits. For an address space as in FIG. 5, accessed by uncompressed addresses represented as in FIG. 6, addresses are encoded within the coherent subsystem as a 33 bit address comprising, of the original 40 bit address, bits 32-0.

In the embodiment of FIG. 7, compression is performed by discarding unused and redundant bits and reusing range bits for slave selection where the range bits are unused for certain ranges. Specifically, for an address space as in FIG. 7, accessed by uncompressed addresses represented as in FIG. 8, addresses are encoded within the coherent subsystem as a 33 bit address wherein bit 32 selects between the DRAM or the SRAMs. If an SRAM is selected, bit 31 indicates an access to SRAM 2, bits 30 indicates an access to SRAM 1, and bit 29 indicates an access to SRAM 0.

Other encodings are possible, particularly within the encoding of bits to select among SRAM 0, SRAM 1, and SRAM 2. This particular "one-hot" encoding of the selection between the SRAM slaves is good for minimizing hardware logic delay. However, the scope of the invention is not limited to such an encoding.

In accordance with some aspects of the invention, the number of bits of the address in each of the embodiments disclosed has been reduced by 17.5%. That is, the compressed addresses within the coherent subsystem use 7 fewer address bits than the 40 bit uncompressed addresses. However, the invention is not limited to such numbers of uncompressed or compressed bits.

Figure 10:
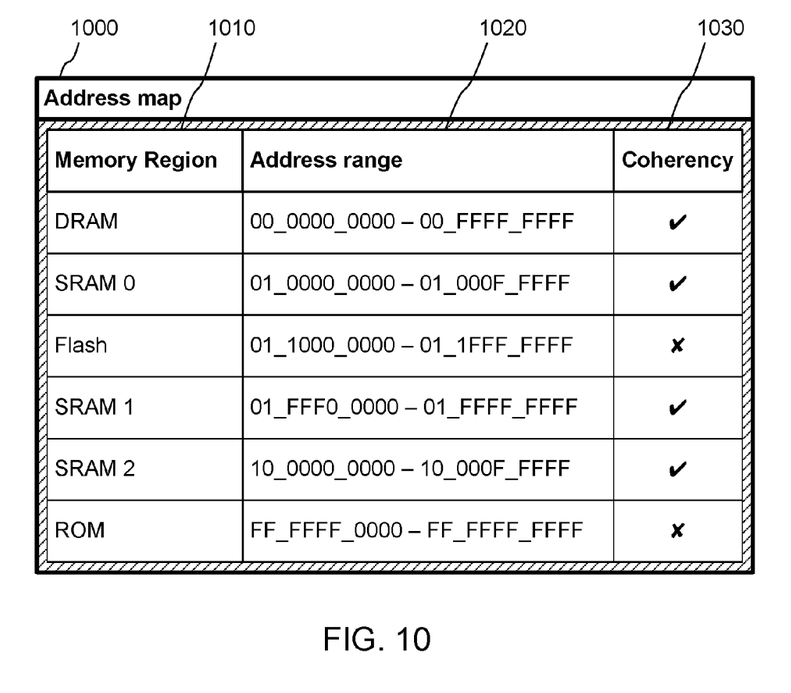
FIG. 10 illustrates logic implementing address compression according to an embodiment of the invention.

According to another aspect of the invention, the memory map is described by a system's designer. The design parameters are provided to a configuration tool. One embodiment uses a programmed computer with a graphical user interface (GUI) as the configuration tool, with a GUI as shown in FIG. 10. A GUI window 1000 shows an address map in a table. In column 1010 the designer names each memory region. In column 1020 the designer specifies the address range of each memory region. In column 1030 the designer specifies whether the memory region is coherent or not. The designer runs the configuration tool, which generates a description of logic to perform address decoding outside of the coherent subsystem, and logic for the coherent subsystem to perform compression.

Figure 11:
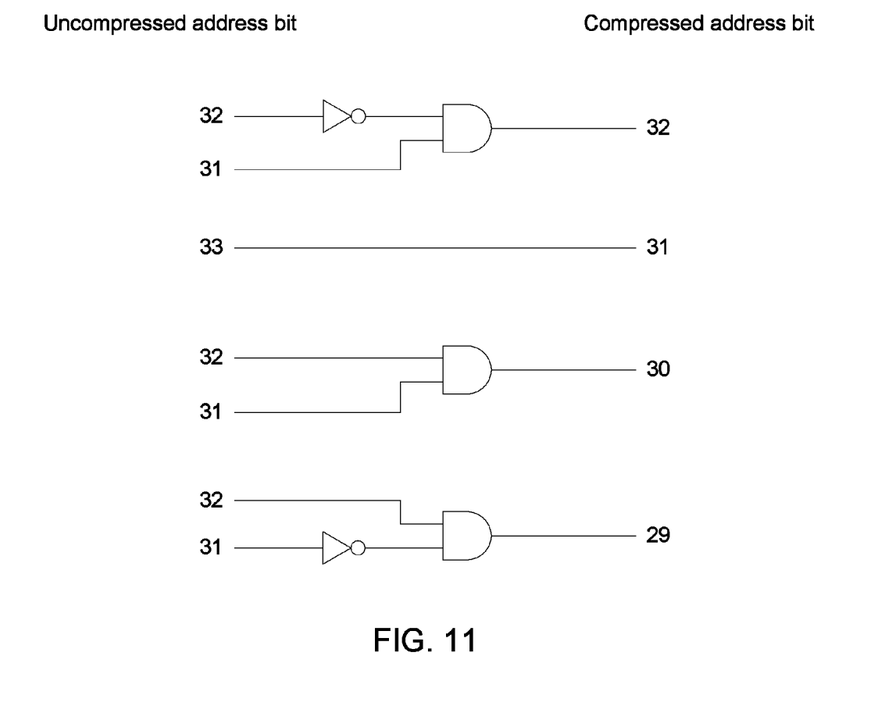
FIG. 11 illustrates a graphical user interface for configuring an address map according to an embodiment of the invention.

Referring now to FIG. 11, for the coherent address map and compression encoding of FIG. 7, the configuration of which is shown in FIG. 8, the configuration tool would generate logic as shown in FIG. 11. According to an aspect of the invention, a choice is made between multiple compression encoding algorithms. The choice is based on the number of levels of logic depth that would be created by each encoding algorithm for the designer's chosen address map, and the number of bits to represent the compressed addresses.

In accordance with the various aspects of the invention, disclosed is a compressor for compressing addresses of coherent-capable slaves. In some embodiments, the compressor includes an interface for receiving an original address including a number of bits, logic to convert the original address to a compressed address including a smaller number of bits, and an interface for sending a compressed addressing including the smaller number of bits. In accordance with some aspects and embodiments the compressor's compression logic performs truncation. Additionally, according to some aspects, the compression logic encodes a selection pattern in at least one bit that is used to address data within the slave including the largest mapping but not used for at least one other slave. In accordance with aspects and embodiments, the selection pattern is one-hot.

In accordance with some aspects, one embodiments of the invention is a physically addressed cache within a fully coherent agent and the physically addressed cache includes a compressor for compressing addresses of coherent-capable slaves. The compressor includes an interface for receiving an original address including a number of bits, logic to convert the original address to a compressed address including a smaller number of bits, and an interface for sending a compressed addressing including the smaller number of bits.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

In accordance with the teaching of the invention a computer and a computing device are articles of manufacture. Other examples of an article of manufacture include: an electronic component residing on a mother board, a server, a mainframe computer, or other special purpose computer each including one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Where a range of values is provided, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Therefore, the scope of the invention, therefore, is not intended to be limited to the various aspects and embodiments discussed and described herein. Rather, the scope and spirit of invention is embodied by the appended claims.

What is claimed is:

1. A cache coherent subsystem of a System-on-Chip (SoC), the SoC associated with a system address space representing all memory locations addressable by the SoC, each system address within the system address space consisting of a first number of address bits representing the entire system address space, the cache coherent subsystem associated with a plurality of predefined coherent-capable memory regions distributed within the system address space, each of the coherent-capable memory regions corresponding to a memory, the subsystem comprising:
   at least one agent that produces a system address within the system address space;
   at least one address compression unit comprising hardware logic, the address compression unit configured to accept the system address from the at least one agent; and
   the hardware logic configured to map each system address within the plurality of coherent-capable memory regions into a smaller address space that exclusively represents all addresses of the plurality of coherent-capable memory regions,
   the address compression unit configured to use the hardware logic to:
      determine whether the system address is within a memory region of the plurality of coherent-capable memory regions;
      in response to determining the system address is within a memory region of the plurality of coherent-capable memory regions, produce a compressed address represented by a second number of address bits, the compressed address consisting of fewer bits than an original system address, and
      using the compressed address to access the memory region of the plurality of coherent-capable memory regions.

2. The cache coherent subsystem of claim 1 further comprising at least one structure for storing addresses, the stored addresses including the compressed address.

3. The cache coherent subsystem of claim 1 further comprising at least one structure for transporting addresses, the transported addresses including the compressed address.

4. The cache coherent subsystem of claim 1 further comprising at least one address decompression unit that accepts the compressed address and produces a decompressed address including the original address.

5. A method of creating a hardware logic for compression of a plurality of coherent-capable memory regions distributed through an entire system address space into a packed address space exclusively representing the plurality of coherent-capable memory regions, the method comprising:
   accepting a specification of a plurality of memory regions;
   accepting an identification of which of the memory regions are coherent;

configuring hardware logic that compresses each address within the plurality of the coherent-capable memory regions into the packed address space that is a smaller address space than the entire system address space using the specification and the identification; and outputting a description of the hardware logic, wherein the hardware logic is configured to:

in response to receiving a system address of the entire system address space, determine whether the system address is within a memory region of the plurality of coherent-capable memory regions;

in response to determining the system address is within a memory region of the plurality of coherent-capable memory regions, produce a compressed address represented by a second number of address bits, the compressed address consisting of fewer bits than an original system address.

6. The method of claim 5 further comprising selecting at least one compression algorithm from a plurality of compression algorithms.

7. The method of claim 6, wherein the at least one compression algorithm is pre-selected.

8. The method of claim 6 wherein the compression algorithm is selected from a plurality of available compression algorithms by configuration inputs into the hardware logic.

9. A cache coherent subsystem of a System-on-Chip (SoC), the SoC associated with a system address space representing all memory locations addressable by the SoC, each system address within the system address space consisting of a first number of address bits representing the entire system address space, the cache coherent subsystem associated with at least one predefined coherent-capable memory region distributed within the system address space, the coherent-capable memory region corresponding to a memory, the subsystem comprising:

at least one agent that produces a system address within the system address space;

at least one address compression unit comprising hardware logic, the address compression unit configured to accept the system address from the at least one agent; and the hardware logic configured to map each system address within the coherent-capable memory region into a smaller address space that exclusively represents all addresses of the coherent-capable memory region, the address compression unit configured to use the hardware logic to:

determine whether the system address is within the coherent-capable memory region;

in response to determining the system address is within the coherent-capable memory region, produce a compressed address represented by a second number of address bits, the compressed address consisting of fewer bits than an original system address, and using the compressed address to access the coherent-capable memory region.

10. The cache coherent subsystem of claim 9 further comprising at least one structure for storing addresses, the stored addresses including the compressed address.

11. The cache coherent subsystem of claim 9 further comprising at least one structure for transporting addresses, the transported addresses including the compressed address.

12. The cache coherent subsystem of claim 9 further comprising at least one address decompression unit that accepts the compressed address and produces a decompressed address including the original address.

13. A method of creating a hardware logic for compression of at least one coherent-capable memory region in an entire system address space into a packed address space exclusively representing the coherent-capable memory region, the method comprising:

accepting a specification of a plurality of memory regions;

accepting an identification of at least one memory region that is the coherent-capable memory region;

configuring hardware logic that compresses each address within the coherent-capable memory region into the packed address space that is a smaller address space than the entire system address space using the specification and the identification; and outputting a description of the hardware logic, wherein the hardware logic is configured to:

in response to receiving a system address of the entire system address space, determine whether the system address is within the coherent-capable memory region;

in response to determining the system address is within the coherent-capable memory region, produce a compressed address represented by a second number of address bits, the compressed address consisting of fewer bits than an original system address.

14. The method of claim 13 further comprising selecting at least one compression algorithm from a plurality of compression algorithms.

15. The method of claim 14, wherein the at least one compression algorithm is pre-selected.

16. The method of claim 14 wherein the compression algorithm is selected from a plurality of available compression algorithms by configuration inputs into the hardware logic.

* * * * *